No. 655,859.  
J. F. FAY.  
VINEYARD HARROW.  
(Application filed Mar. 28, 1900.)

Patented Aug. 14, 1900.

(No Model.)

Witnesses,  
Ed Brandau  
J. H. Nurse

Inventor,  
John F. Fay

UNITED STATES PATENT OFFICE.

JOHN F. FAY, OF GEYSERVILLE, CALIFORNIA, ASSIGNOR OF ONE-HALF TO WILLIAM S. VAUGHAN, OF SAME PLACE.

VINEYARD-HARROW.

SPECIFICATION forming part of Letters Patent No. 655,859, dated August 14, 1900.

Application filed March 28, 1900. Serial No. 10,481. (No model.)

*To all whom it may concern:*

Be it known that I, JOHN F. FAY, a citizen of the United States, residing at Geyserville, county of Sonoma, State of California, have invented an Improvement in Vineyard-Harrows; and I hereby declare the following to be a full, clear, and exact description of the same.

My invention relates to an apparatus which is designed for cultivating the ground in vineyards.

It consists of a central draft-bar, a plurality of parallel timbers hinged to the front of said draft-bar and connected by links with the rear end thereof, so that they may be tilted at any angle with relation to the central bar, a yoke fixed upon said central bar, lever-arms fulcrumed in said yoke and slidably connected with the rear ends of the divergent frames, a centrally-fulcrumed lever passing between the arms of the said fulcrumed yoke and having loose connections with the levers, and a rack mechanism whereby said actuating-lever may be adjusted to rigidly hold the harrow-frames at any angle with relation to the draft-bar.

My invention also comprises means for securing the harrow-frames together and details of construction, which will be more fully explained by reference to the accompanying drawings, in which—

Figure 1:
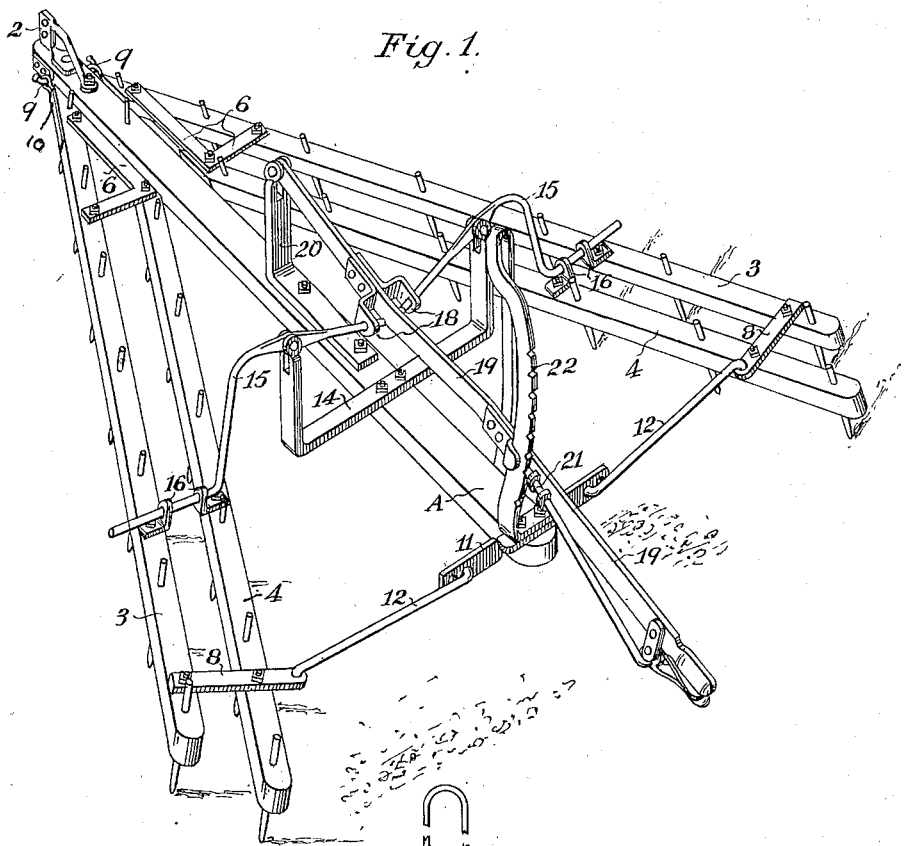
Figure 2:
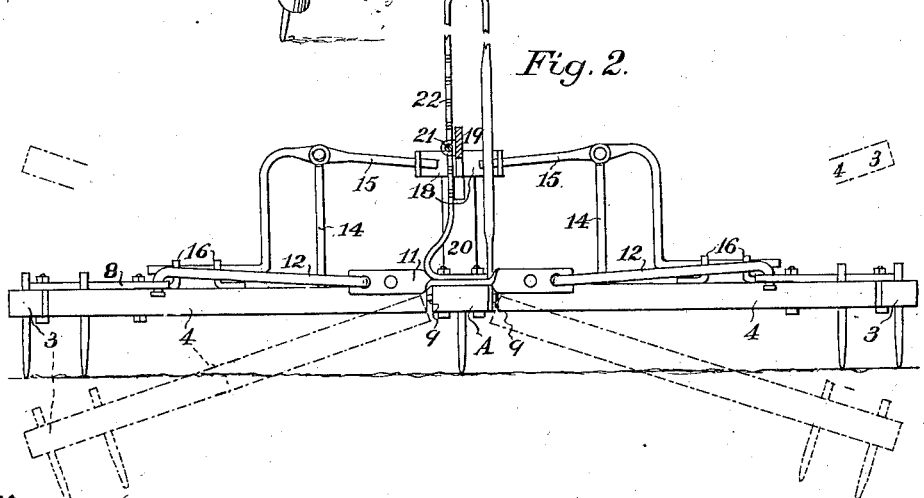

Figure 1 is a perspective view. Fig. 2 is an end elevation.

The object of my invention is to provide a harrow which is especially designed to be used in vineyards. For such purposes it is necessary that the side frames of the harrow carrying the teeth should be adjustable to stand at different angles with relation to the central support and the ground over which they travel and that they should be rigidly held in any position at which they are set. It is the object of my invention to provide such an apparatus that these results can be effected.

A is a central bar, to the front of which a clevis 2 is fixed for the attachment of the team or power by which the harrow is drawn. Upon each side of the central beam are the frames 3 4, to which the harrow-teeth are fixed. These frames are here shown as two in number upon each side, and the bars of each frame are secured together at the front by angle-braces 6, which hold them firmly with relation to each other, one arm of these braces standing, essentially, parallel with the central beam, having the outer end fixed to the outer timber, the angle to the central timber, and the short arm extending at right angles therefrom and also fixed to the outer timber. The rear ends of these pairs of bars are secured together by transverse bars 8, which are also firmly bolted or secured to the timbers, so as to form the pairs upon each side into single structures. These pairs of teeth-carrying timbers are connected to the front end of the bar-beam A by hooks 9, fastened to the beam, and plates 10, secured to the outer frame-timbers, having holes in them which allow them to swivel freely upon the hooks, or other equivalent turnable connections may be employed.

Across the rear end of the beam A is fixed a bar 11, the outer ends of which have a plurality of holes made through for the reception of the inner ends of links 12, the outer ends of which are connected with the transverse bars 8, which unite the rear ends of the tooth-frames. These links are freely turnable at their inner connections with the transverse bar, and the bars to which the outer ends are connected are also loosely turnable upon the links, so that the harrow-frames may be turned up or down about their points of connection and made to stand at any suitable angle with relation to the ground and the central beam. In order to retain these tooth-frames at any desired angle and make the structure rigid when set for work, I have shown a yoke 14, fixed transversely across the rear of the beam A and having upturned ends which form fulcrum-points for the bent levers 15. The outer ends of these levers extend across the tooth-carrying frames 3 4 and are slidable through holes in upturned plates 16, which are secured to the harrow-frames essentially in line with the yoke and the vertical plane of the levers. These lever-arms are freely slidable through these plates, so that when raised or depressed the harrow-frames may accommodate themselves to the movements of the levers. The inner ends of the lever-arms pass through and are slidable in the bent arms 18, which are fixed to the lever 19. The front end of this lever is fulcrumed upon a standard 20, fixed to the beam A and extending upwardly therefrom. The rear end of the lever extends behind the frame and has a suitable handle and is also provided with a spring-pressed latch 21, the end of which is adapted to engage with a curved rack 22. This rack is bolted or otherwise secured upon the rear end of the timber A, and for the purpose of making it stiff and rigid it is curved over at the top and the end carried down and bolted to the timber A at a point in front of the other attachment, so that it forms in a single structure a brace for itself, which will prevent its being moved out of position.

The harrow-frames 3 4 are adjusted to travel between the rows of vines. When a vineyard is plowed, by commencing in the center between the rows of vines the earth is thrown up into a ridge in the center and slopes off on each side toward the rows of vines. When the earth is thrown to the vines, the plowman commences close to the rows and plows toward the center, where there will be a deep dead furrow. In either case it is necessary to set the harrows to the planes of the earth either convex or concave and to lock them so that the weight will act upon all parts equally.

Having thus described my invention, what I claim as new, and desire to secure by Letters Patent, is—

1. The combination in a harrow of a single longitudinally-disposed draft-beam, parallel tooth-carrying beams having a single hinge connection with the front of the draft-beam, said tooth-beams diverging rearwardly from the point of attachment, link connections between the rear of the beams and the rear of the draft-beam, and a lever and mechanism connecting with the tooth-beams whereby the latter may be raised or depressed, and a locking mechanism therefor.

2. In a harrow, a centrally-disposed draft-beam, parallel tooth-beams secured together in pairs upon opposite sides of the draft-beam, a single loose connection between the front of said beams and the front of the draft-beam, said tooth-beams diverging rearwardly from the draft-beam, a bar secured to the rear of the draft-beam, links loosely connecting said bar with the rear of the tooth-beams, a standard mounted upon the draft-beam having a lever fulcrumed thereto and extending rearwardly, a yoke fixed to the draft-beam, levers fulcrumed therein having the outer ends loosely connected with the tooth-beams, and loose connections between the inner end and the lever whereby the tooth-beams may be raised or depressed.

3. The combination in a harrow of a longitudinally-disposed draft-beam, parallel tooth-beams secured together in pairs having the front ends loosely connected with the front of the draft-beam, and the rear ends diverging therefrom, links by which the rear ends of said tooth-beams are loosely connected with the rear of the draft-beam, a yoke fixed upon the draft-beam, bent levers fulcrumed in said yoke with the outer ends slidable in brackets which are secured to the tooth-beams, a lever fulcrumed in front of said yoke, extending rearwardly, said lever having lugs or brackets upon the sides with holes through which the inner ends of the transverse levers are slidable, a vertically-disposed rack fixed upon the rear of the draft-beam, and a spring-pressed pawl carried by the handle adapted to engage with the rack whereby the harrow-frames may be tilted and maintained at any angle with relation to the draft-beam.

4. In a harrow, a central longitudinal draft-beam, divergent tooth-beams loosely connected with the draft-beam at front and rear, a lever, intermediate connections and locking-arms whereby the tooth-beams may be tilted and rigidly locked with relation to the draft-beam, and angle-iron plates fixed to the front ends of the tooth-frames and transverse plates across the rear ends whereby the parallelism of said frames is maintained.

5. The combination of the draft-bar of a harrow with means for connecting the parallel divergent tooth-frames of a harrow, consisting of metallic plates extending transversely across the rear ends of said beams and bolted thereto, angle-plates, the outer ends of which are bolted to the outer tooth-frame, and the angles are bolted to the inner tooth-frame so that the longer arms of said plates are approximately parallel with the draft-bar, and loose connections whereby each pair of beams has a single connection with the draft-bar at each end.

6. In a harrow, a central longitudinal beam with draft attachments, a plurality of parallel tooth-carrying beams located upon each side of the draft-beam and diverging from front to rear with relation thereto, angle-plates by which they are rigidly secured together at the front, and transverse uniting-plates at the rear, loose link connections between the front and rear ends of the tooth-beams and the draft-bar, a lever fulcrumed at the rear of the draft-bar connections between the tooth-beams and said lever whereby the tooth-beams may be tilted to stand at an angle with the draft-beam and means for locking said beams rigidly with relation to each other.

In witness whereof I have hereunto set my hand.

JOHN F. FAY.

Witnesses:
D. L. WINDER,
GEO. M. BOSWORTH.